(12) United States Patent
Patil et al.

(10) Patent No.: US 10,887,806 B2
(45) Date of Patent: Jan. 5, 2021

(54) SYSTEM AND METHOD FOR SUPPORTING 5G USER DEVICES IN A LEGACY WIRELESS CORE NETWORK

(71) Applicant: Verizon Patent and Licensing Inc., Arlington, VA (US)

(72) Inventors: Sudhakar Reddy Patil, Flower Mound, TX (US); Imtiyaz Shaikh, Irving, TX (US); Lalit R. Kotecha, San Ramon, CA (US); Maqbool Chauhan, Keller, TX (US); Robert Avanes, Roanoke, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1 day.

(21) Appl. No.: 16/261,903

(22) Filed: Jan. 30, 2019

(65) Prior Publication Data
US 2020/0245209 A1    Jul. 30, 2020

(51) Int. Cl.
| | |
|---|---|
| *H04W 4/00* | (2018.01) |
| *H04W 36/12* | (2009.01) |
| *H04L 29/08* | (2006.01) |
| *H04W 36/00* | (2009.01) |
| *H04L 12/66* | (2006.01) |

(52) U.S. Cl.
CPC ............ *H04W 36/12* (2013.01); *H04L 12/66* (2013.01); *H04L 67/02* (2013.01); *H04W 36/0069* (2018.08); *H04W 36/0083* (2013.01)

(58) Field of Classification Search
None
See application file for complete search history.

(56) References Cited

U.S. PATENT DOCUMENTS

| | | | |
|---|---|---|---|
| 2015/0256684 A1* | 9/2015 | Mohammed | H04L 63/0428 455/406 |
| 2018/0084464 A1* | 3/2018 | Ozturk | H04W 36/0055 |
| 2019/0149365 A1* | 5/2019 | Chatterjee | H04L 25/0226 370/329 |
| 2019/0254094 A1* | 8/2019 | Babu | H04W 76/15 |
| 2019/0306068 A1* | 10/2019 | Kiss | H04L 45/24 |
| 2019/0373441 A1* | 12/2019 | Ryu | H04W 24/02 |

* cited by examiner

*Primary Examiner* — Phirin Sam

(57) ABSTRACT

Systems and methods described herein enable improve handling of 5G-enabled devices in 4G core networks. The systems and methods described herein provide an enhanced HTTP-based interface between a SMF/PGW-C and a UDM to support interactions required to: (a) perform authorization of PDN access for non-3GPP networks, (b) provide an APN profile to the SMF+PGW-C for the PDN being setup, (c) update the SMF+PGW-C address in the UDM for the PDN being served by non-3GPP networks, and (d) provide operator-specific subscriber parameters from the UDM to the SMF+PGW-C for 3GPP and non-3GPP access.

20 Claims, 7 Drawing Sheets

SYSTEM AND METHOD FOR SUPPORTING 5G USER DEVICES IN A LEGACY WIRELESS CORE NETWORK

BACKGROUND

Long Term Evolution (LTE) is a mobile telecommunications standard for wireless communications involving mobile user equipment, such as mobile devices and data terminals. LTE networks include existing Fourth Generation (4G) and 4.5 Generation (4.5G) wireless networks. Next Generation mobile networks, such as Fifth Generation (5G) mobile networks, have been proposed as the next evolution of mobile wireless networks. 5G mobile networks are designed to increase data transfer rates, increase spectral efficiency, improve coverage, improve capacity, and reduce latency. The proposed 5G mobile telecommunications, among other features, may occupy the millimeter wave bands (e.g., 24, 28, 38, and 60 Gigahertz (GHz)) as well as other frequency bands (e.g., <6 GHz).

While 5G networks are being deployed and evolving, 5G devices need to be supported in legacy networks, such as LTE networks. User devices associated with a 5G New Radio (NR) system may have the capability to communicate via a 5G network, as well as communicate via other networks, such as an LTE-based network. For example, an Evolved Universal Terrestrial Radio Access New Radio Dual Connectivity (EN-DC) device has the capability to exchange data with an LTE base station (e.g., an eNode B), as well as exchange data with a 5G next generation base station (e.g., a gNode B).

DETAILED DESCRIPTION OF THE PREFERRED EMBODIMENTS

Figure 1:
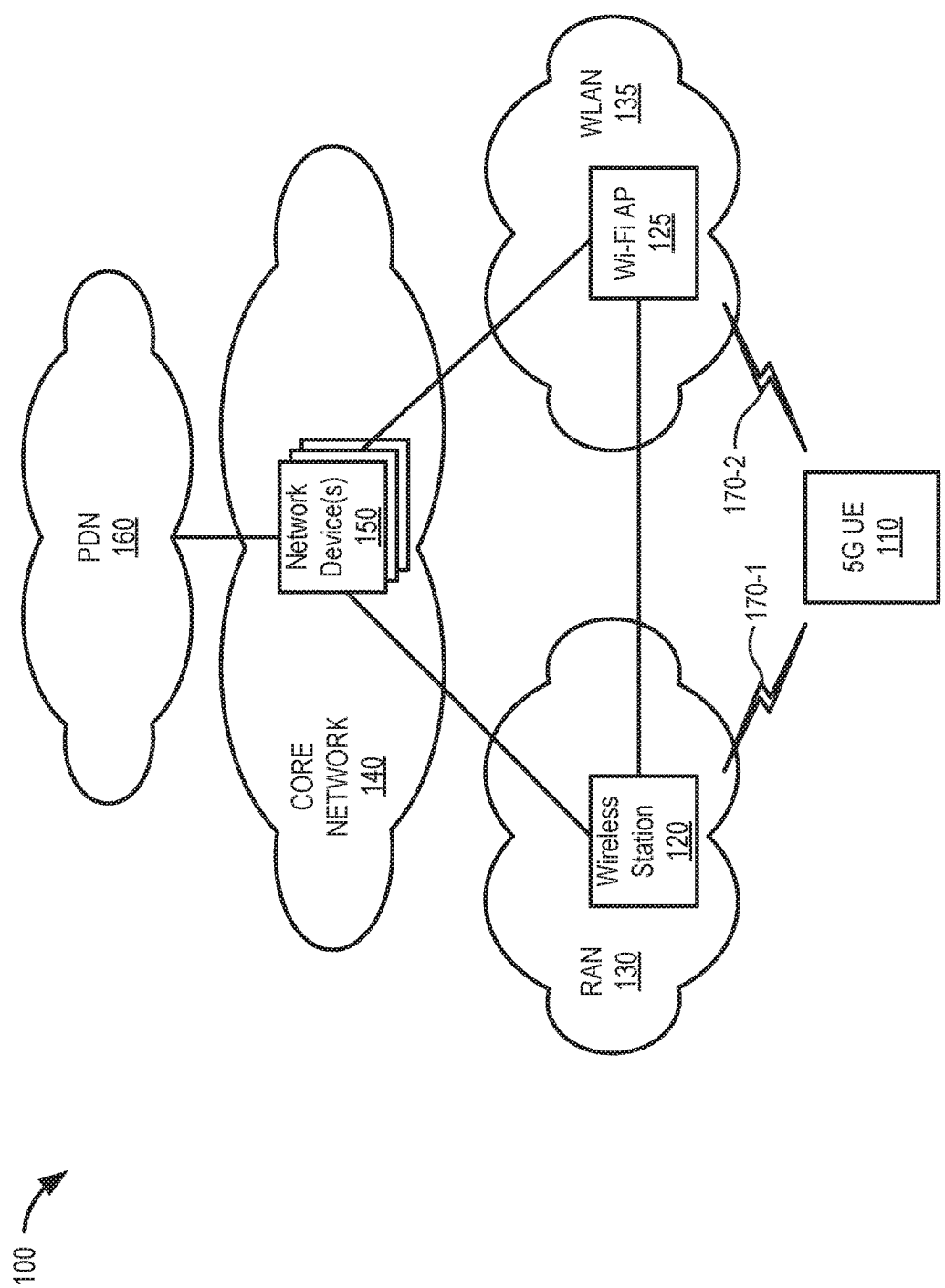
FIG. 1 is a diagram illustrating a network environment according to an implementation described herein.

The following detailed description refers to the accompanying drawings. The same reference numbers in different drawings may identify the same or similar elements. Also, the following detailed description does not limit the invention.

As Fifth Generation (5G) network are being rolled out, user equipment (referred to herein as "5G UE" or a "5G end device") is being configured to connect to both 5G radio access networks (RANs) and 4G RANs, such as an Evolved Universal Mobile Telecommunications System (UMTS) Terrestrial Radio Access Network (E-UTRAN) of a Long Term Evolution (LTE) network. 5G end devices need to be supported in 4G networks because of coverage reasons (e.g., limited coverage areas of 5G RANs), feature support (e.g., features, such as voice-over-LTE, that rely on 4G), and/or certain handover requirements (e.g., handover to a WLAN using an evolved Packet Data Gateway (ePDG)).

There are several situations where 5G UEs can present themselves to 4G networks. For example, 5G UEs may require a handover from a 5G network. As another example, a 5G UE may experience idle mode mobility from 5G network coverage to 4G network coverage. In other instances, 5G UEs may initially attach to a 4G network. In still other instances, 5G UEs may require handover from a WLAN (ePDG) connection. 5G UEs can present themselves to a WLAN (ePDG) by: (a) initially creating a packet data network (PDN) connection in a WLAN (ePDG) or (b) creating a PDN connection to perform a handover to a WLAN (ePDG) from a 4G network or a 5G network.

To support 5G UEs, some network devices in a 4G core network (also referred to as an evolved packet core (EPC) or evolved packet system (EPS)), have been enhanced to service both 4G UEs and 5G UEs. Currently, when a 5G UE is in a 4G network or a WLAN (supported by an ePDG), a combined session management function and PDN gateway-control plane function (SMF+PGW-C) interacts with an authentication, authorization, accounting (AAA) server. More particularly, the SMF+PGW-C interacts with the AAA server to (a) perform authorization of PDN access for Non-3GPP networks, (b) provide APN profiles to PGW-C for the PDN being setup, (c) update a PGW address in a home subscriber server (HSS) for the PDN being served by non-3GPP networks, or (d) provide operator specific subscriber parameters from the HSS to the PGW. These interactions between the SMF+PGW-C and the AAA server are based on Diameter and 4G interfaces.

The SMF+PGW-C of current network configurations has to support multiple interfaces. Particularly, a hypertext transfer protocol (HTTP)-based Nudm interface is used when the 5G UE is in a 5G RAN and a Diameter-based Sb6 interface is used when the 5G UE is in a 4G RAN or WLAN (e.g., via an ePDG). Additionally, with the current network configuration Nudm and Nudr interfaces cannot be used when the 5G UE is connected to a 4G network or WLAN (ePDG). Thus, systems and methods described herein address these limitations where the SMF+PGW-C is required to use a Diameter-based S6b interface with a 3GPP AAA Server.

Systems and methods described herein enhance the HTTP-based Nudm interface (also referred to as a "N10" interface) between the SMF/PGW-C and the UDM to support interactions required to: (a) perform authorization of PDN access for non-3GPP networks, (b) provide an access point name (APN) profile to the SMF+PGW-C for the PDN connection being setup, (c) update the SMF+PGW-C address in the UDM for the PDN being served by non-3GPP networks, and (d) provide operator-specific (e.g., a mobile network operator) subscriber parameters from the UDM to the SMF+PGW-C for 3GPP and non-3GPP access.

FIG. 1 is a diagram of an exemplary environment 100 in which the systems and/or methods, described herein, may be implemented. As shown in FIG. 1, environment 100 may include a 5G UE 110, a wireless station 120 for a RAN 130, an access point (AP) 125 for a wireless LAN 135, a core network 140 with network devices 150, and a packet data network (PDN) 160. According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communication connection via a link may be direct or indirect. For example, an indirect communicative connection may involve an intermediary device and/or an intermediary network not illustrated in FIG. 1. Additionally, the number and the arrangement of links illustrated in environment 100 are exemplary.

In the configuration of FIG. 1, 5G UE 110 may use wireless channels 170-1 and 170-2 (referred to collectively as wireless channels 170) to access wireless station 120 and access point 125, respectively. Wireless channels 170 may correspond, for example, to physical layer protocols in accordance with different radio access technology (RAT) types. For example, wireless channel 170-1 may correspond to physical layer protocols for 4G or 4.5G RAN standards (e.g., 3GPP standards for 4G and 4.5G air interfaces, collectively referred to herein as "4G"), while wireless channel 170-2 may correspond to physical layer protocols for Wi-Fi standards.

5G UE 110 may include any type of mobile device having multiple coverage mode capabilities, and thus communicate with different wireless stations (e.g., wireless stations 120) using different wireless channels (e.g., channels 170) corresponding to the different RANs (e.g., RAN 130) or WLANs (e.g., WLAN 135). 5G UE 110 may include, for example, a cellular radiotelephone, a smart phone, a tablet, any type of internet protocol (IP) communications device, a Voice over Internet Protocol (VoIP) device, a laptop computer, a wearable computer, a gaming device, a media player device, or a digital camera that includes communication capabilities (e.g., wireless communication mechanisms such as Wi-Fi). In other implementations, 5G UE 110 may be implemented as a machine-type communications (MTC) device, an Internet of Things (IoT) device, a machine-to-machine (M2M) device, etc. According to implementations described herein, 5G UE 110 may be provisioned (e.g., via a subscriber identity module (SIM) card or another secure element) to recognize particular network identifiers (e.g., associated with RAN 130) and to support particular RF spectrum ranges. 5G UE 110 may support wireless communications using 5G, 4.5G, 4G, and other air interfaces. Additionally, 5G UE 110 may support simultaneous carrier aggregation of different RAT types (e.g., 4G and 5G NR).

Wireless station 120 may include a network device that has computational and wireless communication capabilities. Wireless station 120 may include a transceiver system that connects 5G UE 110 to other components of RAN 130 and core network 140 using wireless/wired interfaces. Wireless station 120 may be implemented as a base station (BS), a base transceiver station (BTS), a Node B, an evolved Node B (eNB), an evolved LTE (eLTE) eNB, a next generation Node B (gNB), a remote radio head (RRH), an RRH and a baseband unit (BBU), a BBU, or other type of wireless node (e.g., a picocell node, a femtocell node, a microcell node, etc.) that provides wireless access to RAN 130. Each wireless station 120 may support a RAN 130 having different RAT-types. For example, in one implementation, RAN 130 may include an E-UTRAN for an LTE network, while in another implementation, RAN 130 may include a 5G RAN.

Access point 125 may include a device with a transceiver configured to communicate with 5G UE 110 using Wi-Fi signals based on the Institute of Electrical and Electronics Engineers (IEEE) 802.11 standards for implementing a wireless LAN (WLAN) network. WiFi AP 125 may enable 5G UE 110 to communicate with other devices in Wi-Fi WLAN network 135 and with other device in core network 140 via an ePDG.

Core network 140 may include one or multiple networks of one or multiple types. For example, core network 140 may include a terrestrial network and/or a satellite network. According to an exemplary implementation, core network 140 includes a network pertaining to multiple RANs 130. For example, core network 140 may include the core part of an LTE network, an LTE-A network, a 5G network, a legacy network, and so forth.

Depending on the implementation, core network 140 may include various network elements that may be implemented in network devices 150. Such network elements may include a mobility management entity (MME), a user plane function (UPF), a session management function (SMF), a core access and mobility management function (AMF), a unified data management (UDM), a PDN gateway (PGW), a serving gateway (SGW), a policy control function (PCF), a home subscriber server (HSS), as well other network elements pertaining to various network-related functions, such as billing, security, authentication and authorization, network polices, subscriber profiles, network slicing, and/or other network elements that facilitate the operation of core network 140. As described further herein, in the context of a 4G network that is configured to support 5G UEs, core network 140 may include one or more network devices 150 with combined 4G and 5G functionality, such as a SMF+PGW-C and a user plane function with PDN gateway-user plane (UPF+PGW-U).

PDN 160 may include one or more networks, such as a local area network (LAN), a wide area network (WAN), a metropolitan area network (MAN), a telephone network, the Internet, etc., capable of communicating with 5G UEs 110. In one implementation, PDN 160 includes a network that provides data services (e.g., via packets or any other Internet protocol (IP) datagrams) to 5G UE 110.

The number and arrangement of devices in environment 100 are exemplary. According to other embodiments, environment 100 may include additional devices and/or differently arranged devices, than those illustrated in FIG. 1.

Figure 2:
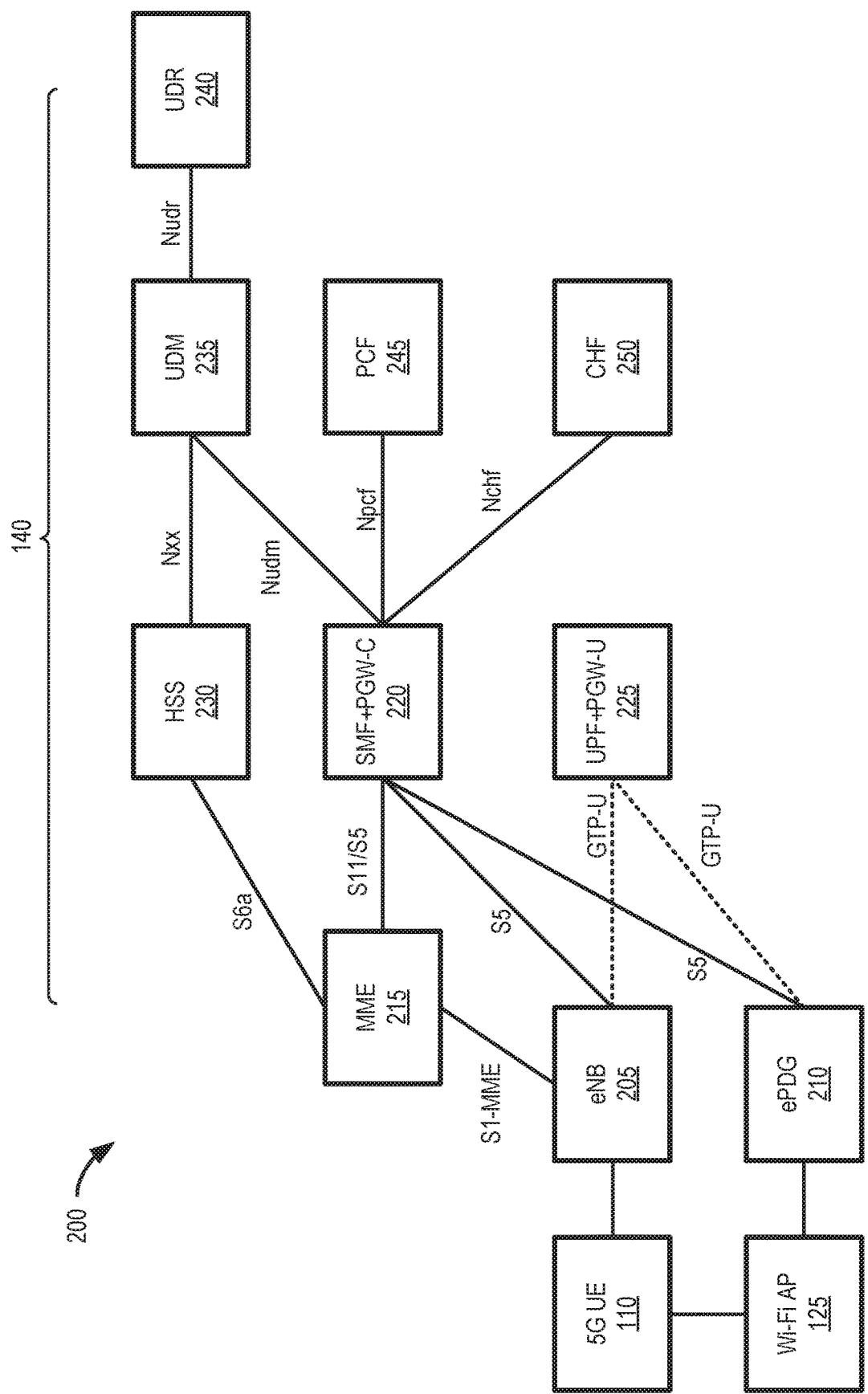
FIG. 2 is a diagram illustrating connections among devices in an exemplary portion of the network environment of FIG. 1.

FIG. 2 is a diagram illustrating connections among devices in an exemplary portion 200 of network environment 100. In the configuration of FIG. 2, 4G connectivity capability is provided to a 5G UE 110 using a 4G eNodeB 205 (corresponding to wireless station 120) and WLAN connectivity is provided to 5G UE 110 via access point 125 and an evolved Packet Data Gateway (ePDG) 210. Core network 140 may include network elements 150 of an Evolved Packet Core (EPC, also referred to as 4G core) that supports 5G UEs 110. As shown in FIG. 2, core network 140 may include an MME device 215, an SMF+PGW-C 220, a UPF+PGW-U 225, an HSS 230, a UDM 235, a unified data repository (UDR) 240, a policy charging function (PCF) 245, and a charging function (CHF) 250. In other implementations, core network 140 may include other network elements 150 associated with a 4G core or a 5G core.

For an end device (e.g., 5G UE 110) to acquire wireless service of a network, the end device has to establish a wireless connection (e.g., a Radio Resource Control (RRC) connection) with a radio access network (RAN), and may authenticate, register, and establish a bearer with a core network. Typically, as part of an attachment procedure with the core network, the end device receives policies from the core network. For example, the policies may include a policy pertaining to route selection for outgoing traffic, and a policy pertaining to network discovery and selection. In contrast with current 4G network configurations for supporting 5G UEs, the architecture of FIG. 2 enables SMF+PGW-C 220 to interact with UDM 235, instead of a AAA server (not shown), to support various authorization, setup and update interactions (as described above).

eNB 205 may include one or more devices and other components having functionality that allows 5G UE 110 to wirelessly connect to RAN 130-1. eNB 205 may interface with core network 140 via an S1 interface, which may be split into a control plane S1-MME interface and a user plane S1-U interface. S1-MME interface may provide an interface between eNB 205 and MME device 215. The S1-U interface may provide an interface between eNB 205 and UPF+PGW-U 225. The S1-U interface may be implemented, for example, using a General Packet Radio Service (GPRS) Tunneling Protocol User Plane (GTP-U).

In FIG. 2, ePDG 210 may include a network device that interfaces core network 140 with untrusted networks, such as a WLAN 130. ePDG 210 may establish a connection between Wi-Fi access point 125 and UPF+PGW-U 225 after 5G UE 110 has been authenticated and authorized. ePDG 210 may communicate with UPF+PGW-U 225 through an S2b interface implemented, for example, using GTPv2. According to implementations described herein, ePDG 210 may authorize and authenticate 5G UE 110 with UDM 235 via SMF+PGW-C 220. For example, ePDG 210 may communicate with SMF+PGW-C 220 via an S5 interface using Diameter protocol.

MME 215 may include a network device that implements control plane processing for core network 140. For example, MME 215 may implement tracking and paging procedures for 5G UE 110, may activate and deactivate bearers for 5G UE 110, may authenticate a user of 5G UE 110, and may interface to non-LTE radio access networks. A bearer may represent a logical channel with particular quality of service (QoS) requirements. When an end device (e.g., 5G UE 110) registers with network 140, MME 215 (the MME instance handling the end device's request) creates a UE context. This context is required for subsequent procedures related to the UE, such as handovers and idle/active mode transitions. MME 215 may communicate with SMF+PGW-C 220 through an S11/S5 interface. The S11/S5 interface may be implemented, for example, using GTPv2. The S11 interface may be used to create and manage a new session for a particular 5G UE 110. The S5 interface may be used to provide user plane tunneling and tunnel management.

SMF+PGW-C 220 may include a network device (e.g., a converged node) that provides SMF functionality for 5G and control plane functionality for 4G. Thus, in one implementation, SMF+PGW-C 220 may be treated as a single network entity that provides/retrieves information for both 4G and 5G core network functions. SMF+PGW-C 220 may perform session establishment, modification, and/or release, perform IP address allocation and management, perform Dynamic Host Configuration Protocol (DHCP) functions, perform selection and control of UPF+PGW-U 225, configure traffic steering at UPF+PGW-U 225 to guide traffic to the correct destination, terminate interfaces toward PCF 245, perform lawful intercepts, charge data collection, support charging interfaces, control and coordinate charging data collection, terminate session management parts of network access stratum (NAS) messages, perform downlink data notification, manage roaming functionality, and/or perform other types of control plane processes for managing user plane data.

According to implementations described herein, UPF+PGW-U 225 may be accessible via a GTP-U interface.

UPF+PGW-U 225 may include a network device (e.g., a converged node) that provides UPF functionality for 5G and user plane functionality for 4G. SMF+PGW-C 220 may maintain an anchor point for intra/inter-RAT mobility, maintain an external Packet Data Unit (PDU) point of interconnection to a data network (e.g., PDN 160), perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a RAN node (e.g., eNodeB 205), and/or perform other types of user plane processes. UPF+PGW-U 225 may communicate with SMF+PGW-C 220 using an N4 interface and connect to PDN 160 using an N6 interface (not shown).

HSS 230 may store information associated with 5G UEs 110 and/or information associated with users of 5G UEs 110. For example, HSS 230 may store subscription profiles that include authentication and access authorization information. Each subscription profile may include a list of 5G UEs 110 associated with the subscription as well as an indication of which 5G UE 110 is authorized to connect to core network 140. MME 215 may communicate with HSS 230 through an S6a interface. The S6a interface may be implemented, for example, using a Diameter protocol.

UDM 235 may maintain subscription information for 5G UE 110, manage subscriptions, generate authentication credentials, handle user identification, perform access authorization based on subscription data, perform network function registration management, maintain service and/or session continuity by maintaining assignment of SMF+PGW-C 220 for ongoing sessions, support SMS delivery, support lawful intercept functionality, and/or perform other processes associated with managing user data. UDM 235 may be accessible to SMF+PGW-C 220 via a Nudm interface.

UDR 240 provides storage and retrieval services for structured data in core network 140. For example, UDR 240 may store subscription data used by UDM 235 and PCF 245, along with application data used by the network exposure functions. According to implementations described herein, UDR 240 is enhanced to store operator-specific parameters (e.g., timeout values, network device/server names, etc.) and any additional non-3GPP subscriber-specific parameters (e.g., WLAN parameters, such the 5G UE's local IP address for the WLAN, other timers, etc.).

PCF 245 may support policies to control network behavior, provide policy rules to control plane functions (e.g., to SMF+PGW-C 220), access subscription information relevant to policy decisions, make policy decisions, and/or perform other types of processes associated with policy enforcement. PCF 245 may be accessible via an Npcf interface. PCF 245 may specify QoS policies based on QoS flow identity (QFI) consistent with, for example, 5G network standards.

CHF 250 provides an interface to a Converged Charging System (CCS, not shown). The CCS essentially combines the separate online and offline charging functions of 4G networks. CHF 250 is the interface between the CCS and the core network 140. CHF 250 may provide spending limits and quotas for services to PCF 245 and/or SMF+PGW-C 220 and may collect usage information from SMF+PGW-C 220.

Although FIG. 2 shows exemplary components of network portion 200, in other implementations, network portion 200 may include fewer components, different components, differently-arranged components, or additional components than depicted in FIG. 2. Additionally or alternatively, one or more components of network portion 200 may perform functions described as being performed by one or more other components of network portion 200.

Figure 3:
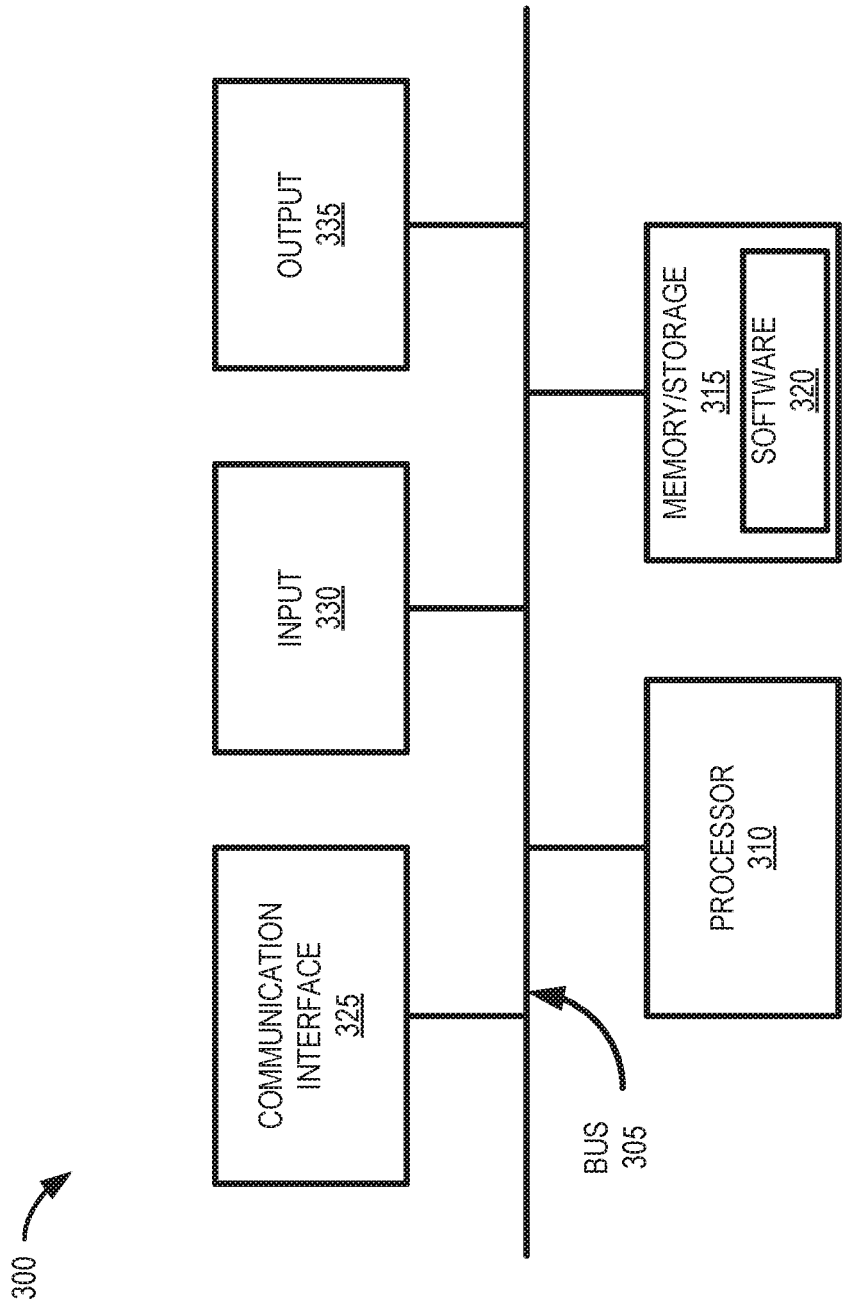
FIG. 3 is a diagram of exemplary components that may be included in one or more of the devices shown in FIGS. 1 and 2.

FIG. 3 is a diagram illustrating exemplary components of a device 300 that may correspond to one or more of the devices described herein. For example, device 300 may correspond to components included in 5G UE 110, AP 125, eNB 205, ePDG 210, MME 215, SMF+PGW-C 220, UPF+PGW-U 225, HSS 230, UDM 235, PCF 245, and CHF 250. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, 5G UE 110 may include logic to perform tasks, as described herein, based on software 320.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
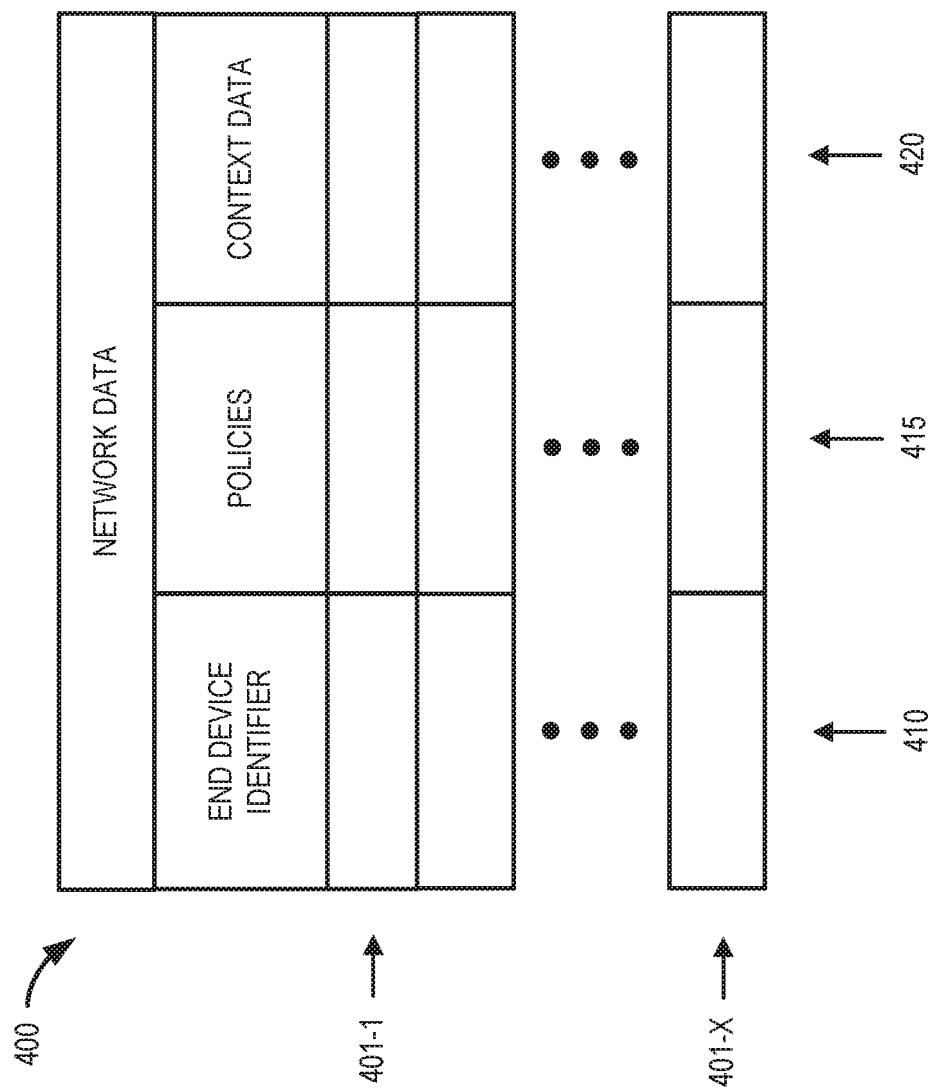
FIG. 4 is a block diagram of exemplary logical components of a unified data repository (UDR) of FIG. 2.

FIG. 4 is a diagram illustrating exemplary network data that may be stored in a table 400. In one implementation, table 400 may be stored in UDR 240. In another implementation, all or portions of table 400 may be temporarily stored by UDM 235. As illustrated, table 400 may include an end device identifier field 410, a policies field 415, and a context data field 420. As further illustrated, table 400 includes entries 401-1 through 401-X (also referred as entries 401, or individually or generally as entry 401) that each includes a grouping of fields 410, 415, and 420 that are interrelated (e.g., a record, etc.). Network data is illustrated in tabular form merely for the sake of description. In this regard, network data may be implemented in a data structure different from a table (e.g., a list, a flat file, etc.). The values illustrated in entry 401-1 are exemplary.

End device identifier field 410 may store data that (uniquely) identifies an end device (e.g., 5G UE 110). For example, the end device identifier may be implemented to include globally unique temporary identifier (GUTI), a permanent equipment identifier (PEI), a subscription permanent identifier (SUPI), and/or another type of identifier.

Policies field 415 may store end device policies. Policies in policies field 415 may include, for example, policies used to select from various types of access networks and polices with operator-specific parameters. For example, among other policies, policies field 415 may include an idle timeout value, a session-timeout value, a server-name influencing selection of Proxy Call Session Control Functions (P-CSCF) for an Internet Protocol Multimedia Subsystem (IMS) APN, a framed-Pool influencing IPv4 address selection for the 5G UE for the APN, aframed-IPv6-Pool influencing IPv6 address selection for the 5G UE for the APN, and a virtual APN name to sub-categorize an APN for the 5G UE.

Context data field 420 may store other types of data pertaining to 5G UE 110 and/or wireless service. For example, context data field 420 may store access and mobility subscription data, SMF selection subscription data, UE context data, and/or other types of data.

According to other exemplary implementations, table 400 may store additional, fewer, and/or different instances of network data in support of the handling 5G UEs in a 4G core network, as described herein.

Figure 5:
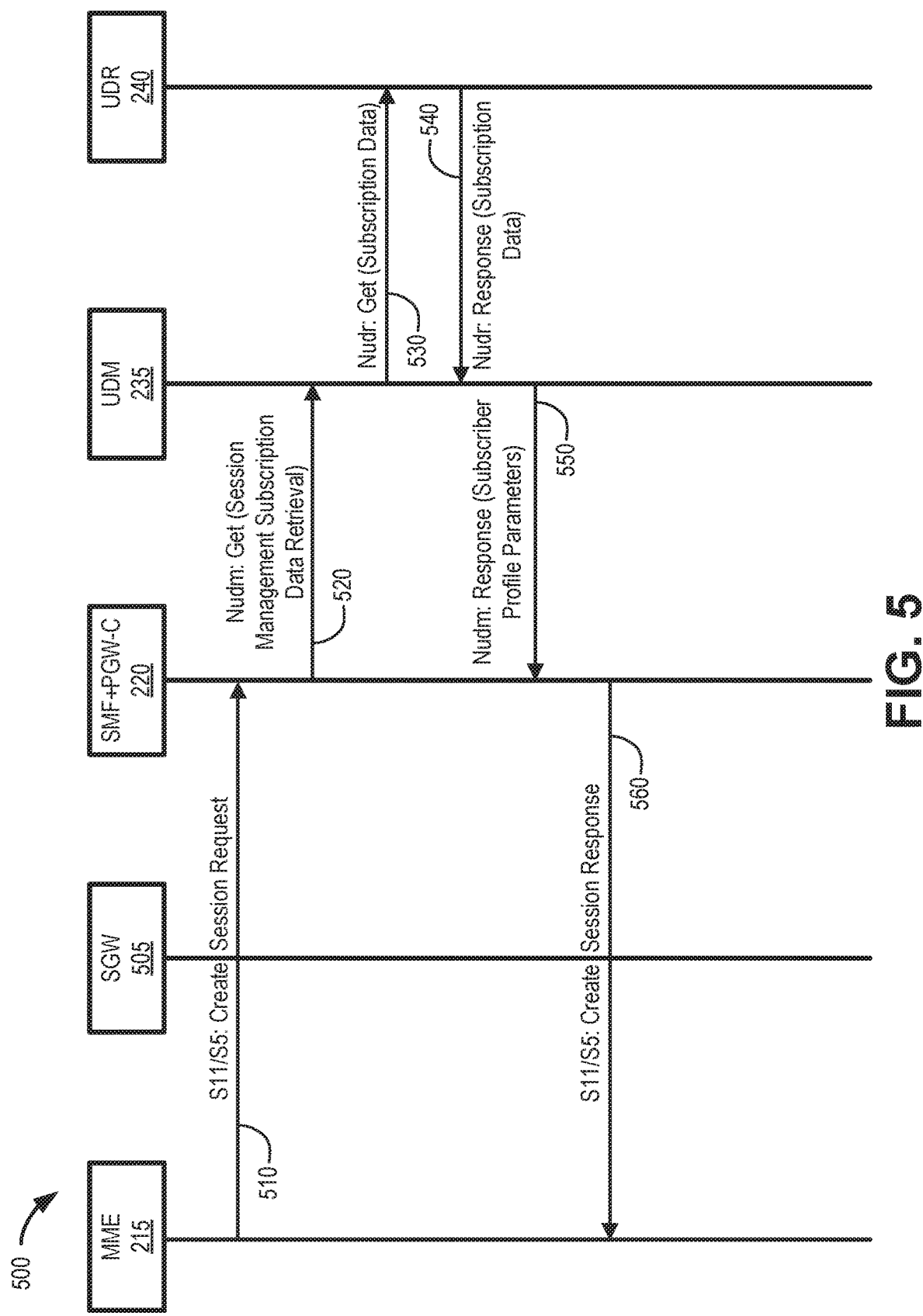
FIG. 5 is a signal flow diagram illustrating exemplary communications for handling 5G UE in a 4G core network, according to an implementation described herein.

FIG. 5 is a diagram illustrating exemplary communications for retrieving operator-specific parameters for a 5G UE in a portion 500 of network environment 100. Network portion 500 may include MME 215, an SGW 505, SMF+PGW-C 220, UDM 235, and UDR 240. Communications shown in FIG. 5 provide simplified illustrations of communications in network portion 500 and are not intended to reflect every signal or communication exchanged between devices.

As shown in FIG. 5, at step 510, MME 215 may submit a Create Session Request via an S11/S5 interface. For example, MME 215 may provide a create session request 510 to SGW 505 via an S11 interface, and SGW 505 may communicate with SMF+PGW-C 220 via an S5 interface to establish a bearer. Create session request 510 may require creation of a PDN context. A PDN context may include the identity of a PGW and APN to indicate which gateway and APN are used for a session. Other types of requests (e.g., for a session handover) may require handing over an existing PDN context. SMF+PGW-C 220 may receive create session request 510 and, in response, submit an HTTP Get message 520 to UDM 235, using a Nudm interface, to retrieve session management subscription data.

UDM 235 may receive Get message 520 and, in response may interact with UDR 240 to retrieve subscriber profile parameters. More particularly, UDM 235 may submit an HTTP Get message 530 to UDR 240, using a Nudr interface, to retrieve subscription data. UDR 240 may receive Get message 530 and, in response, may retrieve the subscription data for 5G UE 110 and provide an HTTP Response 540 to UDM 235, using the Nudr interface, with the requested subscription data.

UDM 235 may receive Response 540 with the subscription data and forward to SMF+PGW-C 220 a corresponding HTTP Response 550 to Get message 520. Response 550 may include subscriber profile parameters based on the subscription data in Response 540. Response 550 may be provided to SMF+PGW-C 220 via a Nudm interface.

SMF+PGW-C 220 may receive Response 550 with the subscriber profile parameters and, in response, applies the policies/charging parameters for the session, applies the QoS profile to the prospective default bearer, and transmits a create session response 560. SMF+PGW-C 220 may forward to MME 215 (via SGW 505) the corresponding Create Session Response 560 to Create Session Request 510. For example, SMF+PGW-C 220 may provide a create session response 560 to SGW 505 via an S5 interface, and SGW 505 may communicate with MME 215 via an S11 interface to establish the bearer. Thus, in the implementation of FIG. 5, SMF+PGW-C 220 is able to establish a bearer for 5G UE 110 without using a connection (e.g., a Diameter-based S6b interface) to a AAA server.

Figure 6:
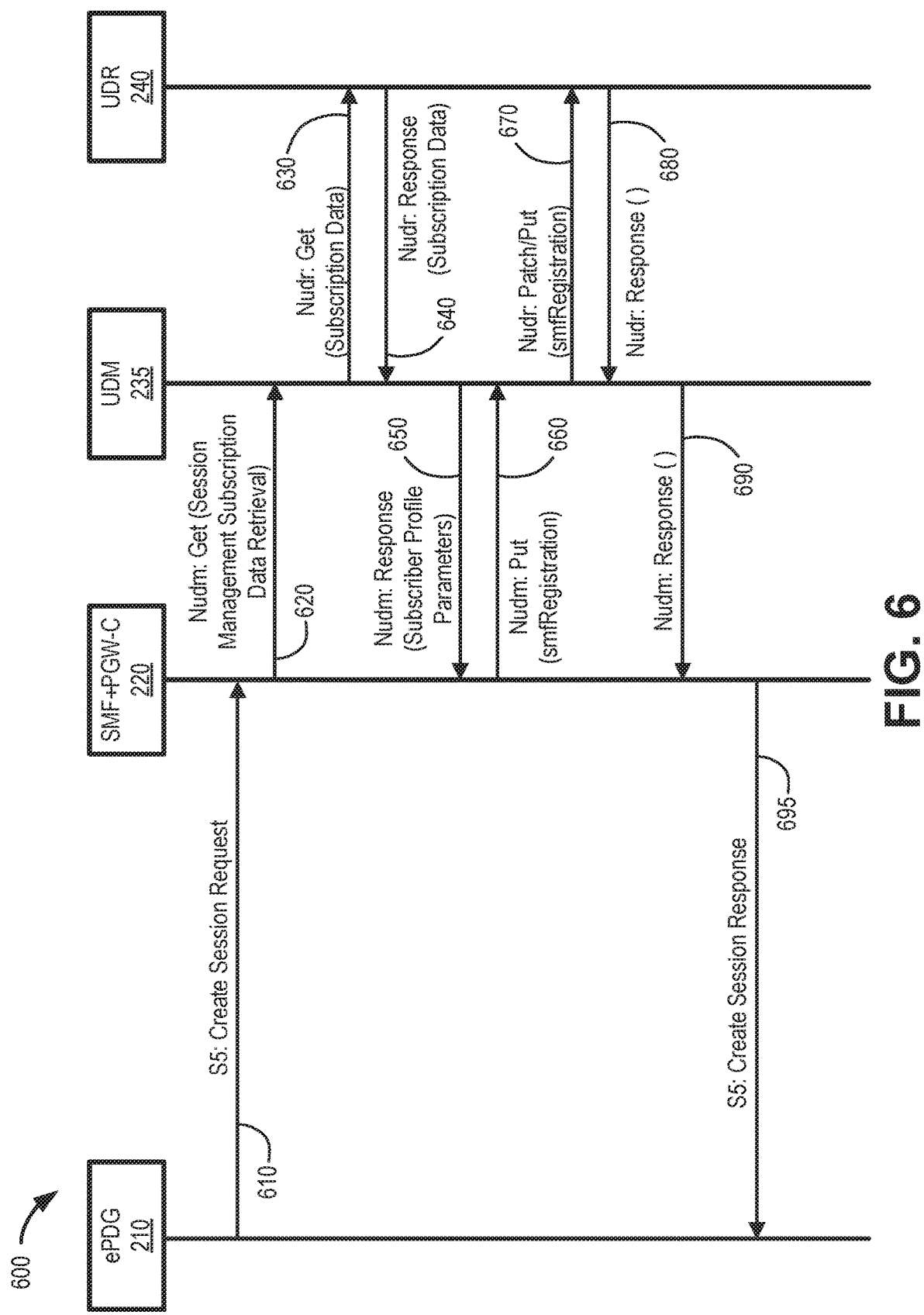
FIG. 6 is a signal flow diagram illustrating exemplary communications for handling 5G UE in a wireless local area network (WLAN), according to another implementation described herein.

FIG. 6 is a diagram illustrating exemplary communications for retrieving operator-specific parameters for a 5G UE in a portion 600 of network environment 100. Network portion 600 may include ePDG 210, SMF+PGW-C 220, UDM 235, and UDR 240. Communications shown in FIG. 6 provide simplified illustrations of communications in network portion 600 and are not intended to reflect every signal or communication exchanged between devices.

As shown in FIG. 6, at step 610, ePDG 210 may submit a create session request via an S5 interface. For example, ePDG 210 may provide a Create Session Request 610 to SMF+PGW-C 220 via an S5 interface to establish a bearer. SMF+PGW-C 220 may receive Create Session Request 610 and, in response, submit an HTTP Get message 620 to UDM 235, using a Nudm interface, to retrieve session management subscription data.

UDM 235 may receive Get message 620 and, in response may interact with UDR 240 to retrieve subscriber profile parameters. More particularly, UDM 235 may submit an HTTP Get message 630 to UDR 240, using a Nudr interface, to retrieve subscription data. UDR 240 may receive Get message 630 and, in response, may retrieve the subscription data for 5G UE 110 and provide an HTTP Response 640 to UDM 235, using the Nudr interface, with the requested subscription data.

UDM 235 may receive Response 640 with the subscription data and forward to SMF+PGW-C 220 a corresponding HTTP Response 650 to Get message 620. Response 650 may include subscriber profile parameters based on the subscription data in Response 640. Response 650 may be provided to SMF+PGW-C 220 via a Nudm interface.

SMF+PGW-C 220 may receive response 650 and may provide a HTTP Put message 660 to register the SMF for the session. Put message 660 may be provided to UDM 235 via the Nudm interface. UDM 235 may receive Put message 660 and, in response, send an HTTP Patch/Put message 670 to UDR 240 to store the SMF registration data for the session. Patch/Put message 670 may be provided to UDR 240 via the Nudr interface.

UDR 240 may receive Patch/Put message 670 and, in response, may update the SMF registration for the 5G UE 110 session and provide an acknowledgment HTTP Response 680 to UDM 235, using the Nudr interface. UDM 235 may receive Response 680 with the acknowledgment and forward to SMF+PGW-C 220 a corresponding acknowledgment HTTP Response 690, responsive to Put message 660.

SMF+PGW-C 220 may receive Response 690 and, in response, applies the policies/charging parameters for the session, applies the QoS profile to the prospective default bearer, and transmits a create session response 695. SMF+PGW-C 220 may forward to ePDG 210 the corresponding Create Session Response 695 to ePDG 210. For example, SMF+PGW-C 220 may provide create session request 695 to ePDG 210 via an S5 interface to establish the bearer. Thus, in the implementation of FIG. 6, SMF+PGW-C 220 is able to establish a bearer through ePDG 210 for 5G UE 110 without using a connection (e.g., a Diameter-based S6b interface) to a AAA server.

Figure 7:
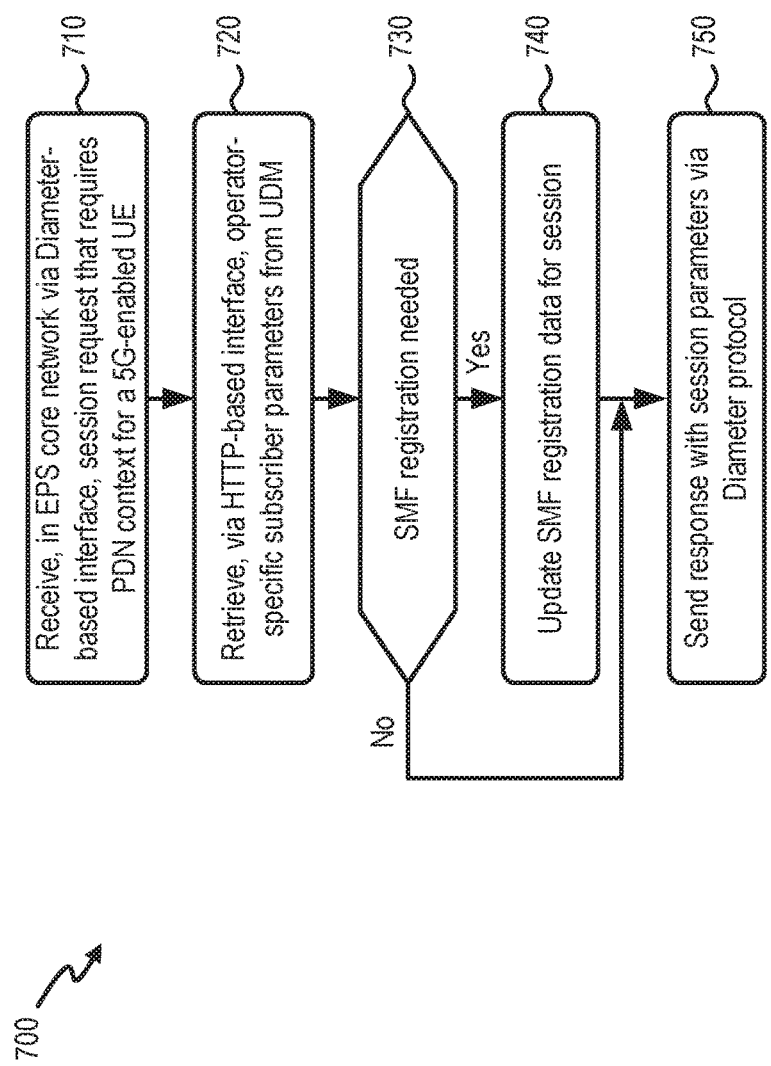
FIG. 7 is a flow diagram illustrating an exemplary process for supporting 5G UEs in a 4G core network, according to an implementation described herein.

FIG. 7 is a flow diagram illustrating an exemplary process 700 to support handling 5G UEs in a 4G core network, according to an implementation described herein. In one implementation, process 700 may be implemented by SMF+PGW-C 220. In another implementation, process 700 may be implemented by an SMF+PGW-C 220 in conjunction with one or more other devices in network environment 100.

Referring to FIG. 7, process 700 may include receiving, in an EPS core network and via a Diameter-based interface, a session request that requires PDN context for a 5G UE (block 710). For example, according to one implementation, MME 215 may provide a create session request 510 to SGW 505 via a Diameter S11 interface, and SGW 505 may communicate with SMF+PGW-C 220 via a Diameter S5 interface to establish a bearer. According to another implementation, ePDG 210 may provide a Create Session Request 610 to SMF+PGW-C 220 via an S5 interface to establish a bearer.

Process 700 may further include retrieving, via an HTTP-based interface, operator-specific subscriber parameters from a UDM function (block 720), and determining if SMF registration is needed (block 730). For example, in response to create session request 510, SMF+PGW-C 220 may submit HTTP Get message 520 to UDM 235, using a Nudm interface, to retrieve session management subscription data. Alternatively, in response to create session request 610, SMF+PGW-C 220 may submit HTTP Get message 620 to UDM 235, using the Nudm interface, to retrieve session management subscription data. UDM 235 may use a Nudr interface to retrieve subscription data from UDR 240 and return a response with subscriber profile parameters to SMF+PGW-C 220.

If SMF registration is needed (block 730—Yes), process 700 may include updating SMF registration for the UE session (block 740). For example, SMF+PGW-C 220 may provide HTTP Put message 660 to register the SMF for the session. Put message 660 may be provided to UDM 235 via the Nudm interface. In response, UDM 235 may send HTTP Patch/Put message 670 to UDR 240 to store the SMF registration data for the session.

If SMF registration is not needed (block 730—No) or after updating SMF registration, process 700 may include sending a response to the session request with session parameters via Diameter protocol. (block 750). For example, according to one implementation, SMF+PGW-C 220 may receive response 550 with the subscriber profile parameters and, in response, applies the policies/charging parameters for the session, applies the QoS profile to the prospective default bearer, and transmits a create session response 560. According to another implementation, SMF+PGW-C 220 may apply the policies/charging parameters for the session, apply the QoS profile to the prospective default bearer, and transmit create session response 695 to ePDG 210.

Systems and methods described herein enable improve handling of 5G-enabled devices in 4G core networks. The systems and methods described herein provide an enhanced HTTP-based interface between a SMF/PGW-C and a UDM to support interactions required to: (a) perform authorization of PDN access for non-3GPP networks, (b) provide an APN profile to the SMF+PGW-C for the PDN being setup, (c) update the SMF+PGW-C address in the UDM for the PDN being served by non-3GPP networks, and (d) provide operator-specific subscriber parameters from the UDM to the SMF+PGW-C for 3GPP and non-3GPP access. Enhancements to the HTTP-based interfaces, such as the Nudr interface and the Nudm interface may be achieved, for example, by extending JavaScript Object Notation (JSON) content.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 7, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A system, comprising:
   a first network device in a core network, the first network device including:
   a first communications interface for sending and receiving signals using a first signaling protocol;
   a second communications interface for sending and receiving signals in the core network using a second signaling protocol;
   one or more memories to store instructions; and
   one or more processors configured to execute the instructions to:
   receive, via the first signaling protocol and from an access network, a request for a 5G-enabled user device, the request requiring a packet data network (PDN) context in the core network; and
   retrieve, in response to the receiving and via the second signaling protocol, operator-specific subscriber parameters from a unified data management (UDM) function when the user device is creating the PDN context in the core network.

2. The system of claim 1, wherein the second communications interface includes a hypertext transfer protocol (HTTP) service-based interface.

3. The system of claim 1, wherein the first communications interface includes a Diameter-based interface.

4. The system of claim 1, wherein the second communications interface includes a Nudm interface.

5. The system of claim 1, wherein the first network device includes a combined session management function and PDN gateway-control plane function (SMF+PGW-C).

6. The system of claim 1, further comprising:
   a second network device in the core network, the second network device configured to:
   obtain the operator-specific subscriber parameters, and
   provide the operator-specific subscriber parameters to the first network device via the second signaling protocol.

7. The system of claim 1, wherein the core network is included in an Evolved Packet System (EPS) network.

8. The system of claim 7, wherein the one or more processors are further configured to execute the instructions to:
   retrieve, via the second signaling protocol, the operator-specific subscriber parameters from the UDM function when the user device is handing over a PDN context from a 5G network to the EPS network.

9. The system of claim 1, wherein the one or more processors are further configured to execute the instructions to:
   retrieve, via the second signaling protocol, the operator-specific subscriber parameters from the UDM function when the user device is creating a Packet Data Unit (PDU) context in a next generation core network.

10. The system of claim 1, wherein the one or more processors are further configured to execute the instructions to:
    retrieve, via the second signaling protocol, non-3GPP subscriber-specific parameters when the user device is creating a PDN context via an evolved Packet Data Gateway (ePDG).

11. The system of claim 1, wherein the one or more processors are further configured to execute the instructions to:
    retrieve, via the second signaling protocol, non-3GPP subscriber-specific parameters when the user device is handing over a PDN context to an evolved Packet Data Gateway (ePDG).

12. A method comprising:
    receiving, by a network device in a core network of an Evolved Packet System (EPS) network, a request for a 5G-enabled user device,
    wherein the request a requires packet data network (PDN) context, and
    wherein the request is received via a first communications interface for sending and receiving signals using a first signaling protocol; and
    retrieving, by the network device and in response to the receiving, operator-specific subscriber parameters from a unified data management (UDM) function in the core network when the user device is creating the PDN context in the core network,
    wherein the retrieving uses a second communications interface for sending and receiving signals within the core network using a second signaling protocol, and
    wherein the first signaling protocol is different than the second signaling protocol.

13. The method of claim 12, wherein the second signaling protocol is implemented over a hypertext transfer protocol (HTTP) service-based interface.

14. The method of claim 13, wherein the second signaling protocol includes a Nudm interface, and wherein the first signaling protocol includes a Diameter-based interface.

15. The method of claim 12, wherein the network device includes a combined session management function and PDN gateway-control plane function (SMF+PGW-C).

16. The method of claim 12, further comprising:
    obtaining, by the UDM function, the operator-specific parameters from a unified data repository; and
    providing the operator-specific parameters to the network device via the second signaling protocol.

17. The method of claim 12, wherein receiving the request for the 5G-enabled user device includes receiving a create session request from one of:
    a mobility management entity (MME) device serving the 5G-enabled user device, or
    an evolved Packet Data Gateway (ePDG) device serving the 5G-enabled user device.

18. A non-transitory computer-readable medium containing instructions executable by at least one processor, the computer-readable medium comprising one or more instructions to cause the at least one processor to:
    receive, by a network device in a core network of an Evolved Packet System (EPS) network, a request for a 5G-enabled user device,
    wherein the request requires a packet data network (PDN) context in the core network, and
    wherein the request is received via a first communications interface for sending and receiving signals using a first signaling protocol; and
    retrieve, by the network device and in response to the receiving, operator-specific subscriber parameters from a unified data management (UDM) function when the user device is creating the PDN context in the core network,
    wherein the retrieving uses a second communications interface for sending and receiving signals within the core network using a second signaling protocol, and
    wherein the first signaling protocol is different than the second signaling protocol.

19. The non-transitory computer-readable medium of claim 18, wherein the first signaling protocol includes a Diameter-based interface and wherein the second signaling protocol includes a hypertext transfer protocol (HTTP) service-based interface.

20. The non-transitory computer-readable medium of claim 19, further comprising instructions to cause the at least one processor to:

provide, via the first signaling protocol, the operator-specific subscriber parameters in response to the request.

* * * * *